United States Patent
Lee

(10) Patent No.: US 11,004,213 B2
(45) Date of Patent: May 11, 2021

(54) METHODS AND SYSTEMS FOR DETERMINING MOTION OF A DEVICE

(71) Applicant: Charles Chungyohl Lee, Austin, TX (US)

(72) Inventor: Charles Chungyohl Lee, Austin, TX (US)

(73) Assignee: KoreoGRFX, Inc., Austin, TX (US)

( * ) Notice: Subject to any disclaimer, the term of this patent is extended or adjusted under 35 U.S.C. 154(b) by 192 days.

(21) Appl. No.: 15/414,377

(22) Filed: Jan. 24, 2017

(65) Prior Publication Data

US 2017/0213351 A1 Jul. 27, 2017

Related U.S. Application Data

(60) Provisional application No. 62/286,470, filed on Jan. 25, 2016.

(51) Int. Cl.
| | |
|---|---|
| *G06T 7/246* | (2017.01) |
| *G06T 7/90* | (2017.01) |
| *A63F 13/213* | (2014.01) |
| *G06T 7/136* | (2017.01) |
| *G06K 7/14* | (2006.01) |

(52) U.S. Cl.
CPC ............ *G06T 7/246* (2017.01); *A63F 13/213* (2014.09); *G06K 7/1417* (2013.01); *G06T 7/136* (2017.01); *G06T 7/90* (2017.01); *G06T 2207/10016* (2013.01); *G06T 2207/10024* (2013.01); *G06T 2207/30204* (2013.01); *G06T 2207/30241* (2013.01)

(58) Field of Classification Search
CPC . G06T 7/246; G06T 7/11; G06T 7/136; G06T 7/90; G06T 2207/10016; G06T 7/10024; G06T 7/30204; G06T 2207/30241; A63F 13/213
See application file for complete search history.

(56) References Cited

U.S. PATENT DOCUMENTS

| | | | |
|---|---|---|---|
| 5,303,917 A * | 4/1994 | Uke | ..................... A63B 59/54 |
| | | | 473/567 |
| 6,077,204 A | 6/2000 | Dickinson, Jr. | |
| 6,411,953 B1 | 6/2002 | Ganapathy et al. | |
| 6,577,352 B1 | 6/2003 | Park et al. | |
| 7,244,219 B1 | 7/2007 | Preciado | |

(Continued)

OTHER PUBLICATIONS

"Color Models", Sep. 2007, Intel, Intel Integrated Performance Primitives for Intel Architecture, vol. 2, p. 6-9-6-15. (Year: 2007).*

(Continued)

*Primary Examiner* — Vincent Rudolph
*Assistant Examiner* — Timothy Choi
(74) *Attorney, Agent, or Firm* — Pierson Intellectual Property LLC

(57) ABSTRACT

Embodiments disclosed herein provide systems and methods for determining motion of a striking or blocking device. Embodiments may be utilized in various embodiments when it is desired to track, determine, etc. the motion of a device. For example, embodiments may be utilized in martial arts, sports, activities, instructional videos, video games, etc. More specifically, embodiments may be configured to automatically detect fast movements of a device using video cameras or image capturing devices.

17 Claims, 7 Drawing Sheets

(56) References Cited

U.S. PATENT DOCUMENTS

| | | |
|---|---|---|
| 7,263,207 B2 | 8/2007 | Lee et al. |
| 8,167,743 B1 | 5/2012 | Kangas et al. |
| 8,224,024 B2 | 7/2012 | Foxlin et al. |
| 8,600,109 B2 | 12/2013 | Shen et al. |
| 8,698,908 B2 | 4/2014 | Slavin |
| 2007/0081695 A1* | 4/2007 | Foxlin .................. G06T 7/73 382/103 |
| 2008/0048106 A1* | 2/2008 | Blanchard ............ G07D 7/121 250/252.1 |
| 2009/0278961 A1 | 11/2009 | Mohanty et al. |
| 2010/0182340 A1 | 7/2010 | Bachelder et al. |
| 2011/0025853 A1 | 2/2011 | Richardson |
| 2011/0158470 A1 | 6/2011 | Martin et al. |
| 2011/0303748 A1* | 12/2011 | Lemma ............... G06K 7/1456 235/454 |
| 2014/0078313 A1 | 3/2014 | Son et al. |
| 2014/0097250 A1* | 4/2014 | Antognini ............ G06K 1/123 235/454 |
| 2014/0121069 A1 | 5/2014 | Corbett |
| 2014/0313349 A1* | 10/2014 | Aoki .................... H04N 17/002 348/187 |
| 2014/0334723 A1* | 11/2014 | Chatow .............. G06K 19/0614 382/165 |
| 2015/0055821 A1 | 2/2015 | Fotland |
| 2015/0085155 A1* | 3/2015 | Diaz Spindola ...... G06T 19/006 348/222.1 |

OTHER PUBLICATIONS

Belghit et al.,"Tracking Color Marker Using Projective Transformation for Augmented Reality Application", May 2012, IEEE, 2012 Int. Conf. on Multimedia Computing Systems, p. 1-6. (Year: 2012).*

"RGB2HSV" and "HSV2RGB", Sep. 2007, Intel, Intel Integrated Performance Primitives for Intel Architecutre, vol. 2, p. 6-115-6-117. (Year: 2007).*

Wang et al. "Practical Color-Based Motion Capture", Aug. 2011, The Eurographics Association, ACM SIGGRAPH Symposium on Computer Animation, p. 139-146. (Year: 2011).*

Scholz et al., "Garment Motion Capture Using Color-Coded Patterns", 2005, Eurographics Association and Blackwell Publishing, Computer Graphics Forum 2005, vol. 24, No. 3, p. 1-3. (Year: 2005).*

White et al., "Capturing and Animating Occluded Cloth", Jul. 2007, ACM, ACM Transactions on Graphics, vol. 26, No. 3, p. 34-1-34-8. (Year: 2007).*

* cited by examiner

METHODS AND SYSTEMS FOR DETERMINING MOTION OF A DEVICE

CROSS-REFERENCE TO RELATED APPLICATIONS

This application claims a benefit of priority under 35 U.S.C. § 119 to Provisional Application No. 62/226,470 filed on Jan. 25, 2016, which is fully incorporated herein by reference in its entirety.

BACKGROUND INFORMATION

Field of the Disclosure

Examples of the present disclosure relate to techniques for determining motion of a moving, striking, or blocking device. More specifically, embodiments relate to a device that is configured to determine movement associated with a strike, block, or avoidance of an object in a plurality of axes for video games.

Background

Martial arts are systems and traditions of combat practices, which are practiced for a variety of reasons, including: self-defense, competition, physical health and fitness, entertainment, and development. Traditionally when practicing the martial arts, a user may use striking targets, such as target paddles, bags, etc. These devices allow the user practicing martial arts to strike the target along two axes, left-to-right and top-to-bottom, or left-to-right and head-on. Furthermore, users may practice martial arts using single axial devices, such as breaking boards, where the user may only strike the target head on.

Utilizing a traditional target, it is required for someone to detect the correctness of the strikes by holding the target, and manually determining the strike. For example, a second user may hold a target, such as a punching bag, a padded striking post, etc. Responsive to a first user striking the target, the first user or the second user must manually determine if the first user's strike hit the target at a desired location using correct form. However, situations may arise where the first or second user cannot determine accuracy or correctness of the strikes.

Also in martial arts practice, it is just as important to practice defensive techniques such as blocking and avoidance (for example, blocking a punch or kick, ducking under a kick, slipping a punch by moving the head sideways or backwards, or jumping over a swinging sword).

However, in rapidly-paced martial arts practice, one may encounter a hundred or more strikes or blocks in a single minute. As such, it is harder to accurately keep track of how many of the strikes or blocks were effective, as well as how much force was put into each strike, etc.

Accordingly, needs exist for more effective and efficient methods to determine the movement of a striking or blocking device (referred to hereinafter collectively and individually as a "striking device") utilizing conventional cameras. This allows automated (and completely objective) determination of if the device was effectively struck (during offensive practice with the device), or the device was effectively blocked or avoided (during defensive practice with the device). Embodiments may also be configured to measure the force with which the striking device was struck or blocked accurately.

SUMMARY

Embodiments disclosed herein provide systems and methods for determining motion of a striking device. Embodiments may be utilized in various embodiments when it is desired to track, determine, etc. the motion of the striking device. For example, embodiments may be utilized in martial arts, sports, activities, instructional videos, video games, training simulations, etc. More specifically, embodiments may be configured to automatically determine fast movements of the striking device using video cameras or image capturing devices.

Embodiments may include a striking device and motion tracking hardware. The striking device may be a padded mock weapon used to simulate handheld combat. The striking device may include a handle, an energy dampening shaft, and an energy-dampening head. The striking device may be configured to slow the struck movement when performing a striking action in martial arts. By dampening or slowing down the speed of movement of the striking device, image capturing hardware may be configured to accurately track the movement of the striking device without too much fast-action-induced motion blur.

The striking device may also include a plurality of pre-determined image patterns. The image patterns include a plurality of different colors, patterns, shapes, etc., wherein each image pattern includes the same colors in various layouts. The colors within the image patterns may be positioned in close proximity to each other.

The motion tracking hardware may include an image capturing device such as a camera. The camera may be a device that is configured to record still images or videos. The camera may be configured to record images continuously and/or over repetitive intervals. The recorded images may be processed via a chrominance matching hardware device and a luminance matching hardware device.

The chrominance matching hardware may be configured to determine regions in an image that include two or more of the pre-determined colors in close proximity to each other. The chrominance matching hardware may be configured to determine the predetermined colors in the YCrCb color space to be independent of various lighting conditions. In embodiments, the regions may be defined as continuous regions of pixels that include only the predetermined colors.

The luminance matching hardware may be configured to determine the relative luminance of the predetermined images of the colors within the regions that are in close proximity to each other. In embodiments, if the luminance of the colors within the regions are not within a luminance ratio range, those regions may be removed from the image.

Then, the motion tracking hardware may be configured to determine the location of each of the predetermined regions on the striking device in a plurality of successive images. Responsive to determining the location of the predetermined regions on the striking device in the plurality of images, the motion tracking hardware may be configured to determine the movement of striking device using image-processing algorithms.

Embodiments may allow a more reliable auto-detection of fast-moving strikes utilizing technology found in smartphones and/or tablets. Embodiments are configured to detect tri-axial movements of the striking device. Embodiments may have advantages over teaching complex "katas" (sequence of fighting moves) that are common in Karate. As an example, in a kata you might be required to do a roundhouse kick (striking from right to left), followed by a front kick (striking from below to up), followed by a cross punch (striking straight in). Utilizing embodiments with a tri-axial design, a user may couple the striking device to a stationary stand, and perform strikes at various angles and positioning. Thus, a single person may be able to utilize embodiments.

However, in order to accomplish the same functionality with traditional Martial Arts striking targets (either single- or dual-axial devices), a user needs a robot or a human to possibly rotate the target after each strike.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
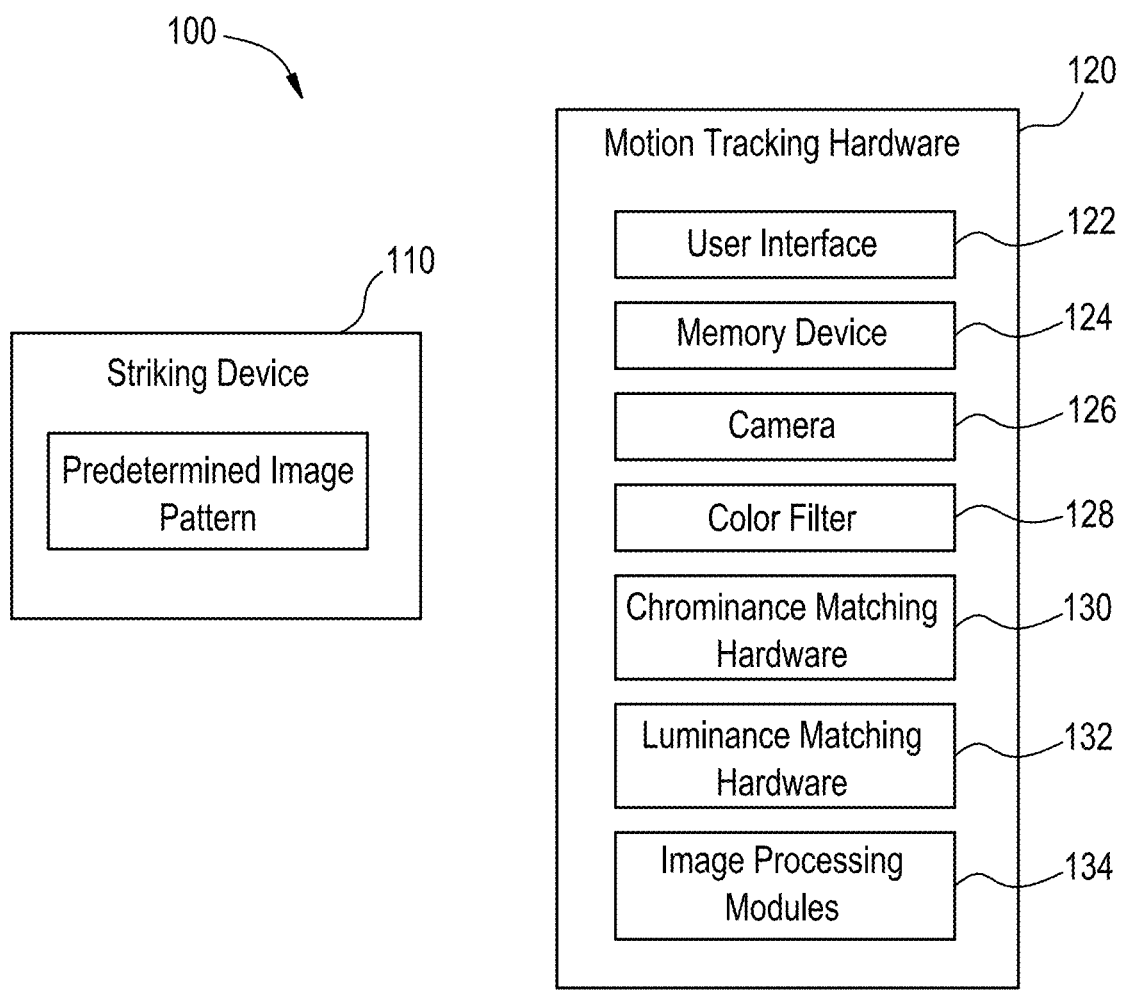
FIG. 1 depicts a system for tracking a striking device, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Embodiments disclosed herein provide systems and methods for determining motion of a striking device. Embodiments may be utilized in various embodiments when it is desired to track, determine, etc. the motion of a device. For example, embodiments may be utilized in martial arts, sports, activities, instructional videos, video games, etc. More specifically, embodiments may be configured to automatically detect fast movements of a device using video cameras or image capturing devices.

Turning now to FIG. 1, FIG. 1 depicts a system 100 for tracking a striking device 110, according to an embodiment. System 100 may include striking device 110 and motion tracking hardware 120.

Striking device 110 may be a sports accessory such as a padded mock weapon, golf club, tennis racket, baseball bat, etc. In other embodiments, striking device 110 may be any device with a handle, shaft, head, and a plurality of predetermined image patterns. The handle may be a part of the striking device that is configured to be held by a hand of the user. The shaft may be a long tube, channel, or part that is configured to couple the handle with the head of striking device 110. The head may be positioned on a distal end of striking device 110, and may be configured to contact an object. The head may have a wider circumference than the handle and shaft.

The plurality of predetermined image patterns may be various patterns with a plurality of predetermined colors, wherein colored groupings within the image pattern may be proximally located to each other. For example, two distinct colors on the YCrCb color spectrum may comprise two separate image patterns. Each of the predetermined image patterns may have substantially the same shape, including multiple subsections of the plurality of predetermined colors. Furthermore, each of the predetermined image patterns may have substantially the same luminance ratio between the pre-determined colors.

Motion tracking hardware 120 may be configured to track the movement of striking device 110. Motion tracking hardware 110 may be a desktop computer, a handheld computer, a tablet computing platform, a Smartphone, a gaming console, and/or other computing platforms. Motion tracking hardware 110 may include a user interface 122, a memory device 124, a camera 126, color filter 128, chrominance matching hardware 130, luminance matching hardware 132, and image-processing modules 134.

The user interface 122 may be a touch screen, a physical keyboard, a mouse, a camera, a controller, a joystick, a microphone, etc., wherein the user interface 122 is configured to receive inputs from a user. In embodiments, responsive to the user utilizing the user interface 122, the user may begin recording images. The user interface 122 may be used to set preselected colors, begin and end recording by the camera, etc.

The memory device 124 may be a device that comprises non-transitory storage media that electronically stores information. The memory device 124 may include one or both of system storage that is provided integrally (i.e., substantially non-removable) within motion tracking hardware 120 and/or removable storage that is removably connectable to motion tracking hardware 120 via, for example, a port (e.g., a USB port, a firewire port, etc.) or a drive (e.g., a disk drive, etc.). The memory device 124 may include one or more virtual storage resources (e.g., cloud storage, a virtual private network, and/or other virtual storage resources). The memory device 124 may store software algorithms, information determined by a processor, information received from the camera, and/or other information that enables motion tracking hardware 120 to function as described herein. For example, the memory device 124 may be configured to store data associated with the predetermined image patterns, such as the pre-selected colors. Data associated with the predetermined image patterns with the pre-selected colors may be utilized by the chrominance matching hardware 130, luminance matching hardware 132, and image-processing modules 134.

The camera 126 may be a device that is configured to record still images or videos. The camera 126 may be an optical instrument configured to record images, which may be stored on the memory device. The images may be still photographs or sequences of images comprising videos or movies. For example, the camera 126 may be a camera located on a smart phone, web cam, tablet, etc. The camera 126 may be configured to record images continuously and/or over repetitive intervals. The recorded images may be processed via a chrominance matching hardware device 130 and a luminance hardware processing device 132.

The color filter 128 may be configured to filter colors out of an image taken by the camera. In embodiments, the color filter 128 may be configured to remove pixels within the image that do not include the preselected colors.

The chrominance matching hardware 130 may be configured to determine regions in an image having two or more of the pre-determined colors in close proximity to each other. The chrominance matching 130 hardware may be configured to determine the predetermined colors in the YCrCb color space, which may be independent of various lighting conditions. In embodiments, a close proximity between two pixels may be based on a number of pixels, a real world distance determined by the image-processing modules, or any other desired distance.

The luminance matching hardware 132 may be configured to determine the relative luminance of the predetermined images of the colors within the regions that are in close proximity to each other. The luminance matching hardware 132 may be configured to measure the luminance intensity (Y) in the YCrCb color space. In embodiments, if the luminance of the various colored pixels within the regions with the predetermined colors that are in close proximity to each other are not within a luminance ratio range, those regions may be removed from the image.

The image-processing modules 134 may be configured to determine the location of each of the predetermined regions on a striking device 110 in a plurality of successive images. Responsive to determining the location of the predetermined regions on the striking device 110 in the plurality of images, the image-processing modules may be configured to determine the movement of striking device 110 using known image-processing algorithms. The known image-processing algorithms may utilize the positioning of the predetermined regions on the striking device and corresponding time stamps on images to determine the movement of the striking device 110.

Figure 2:
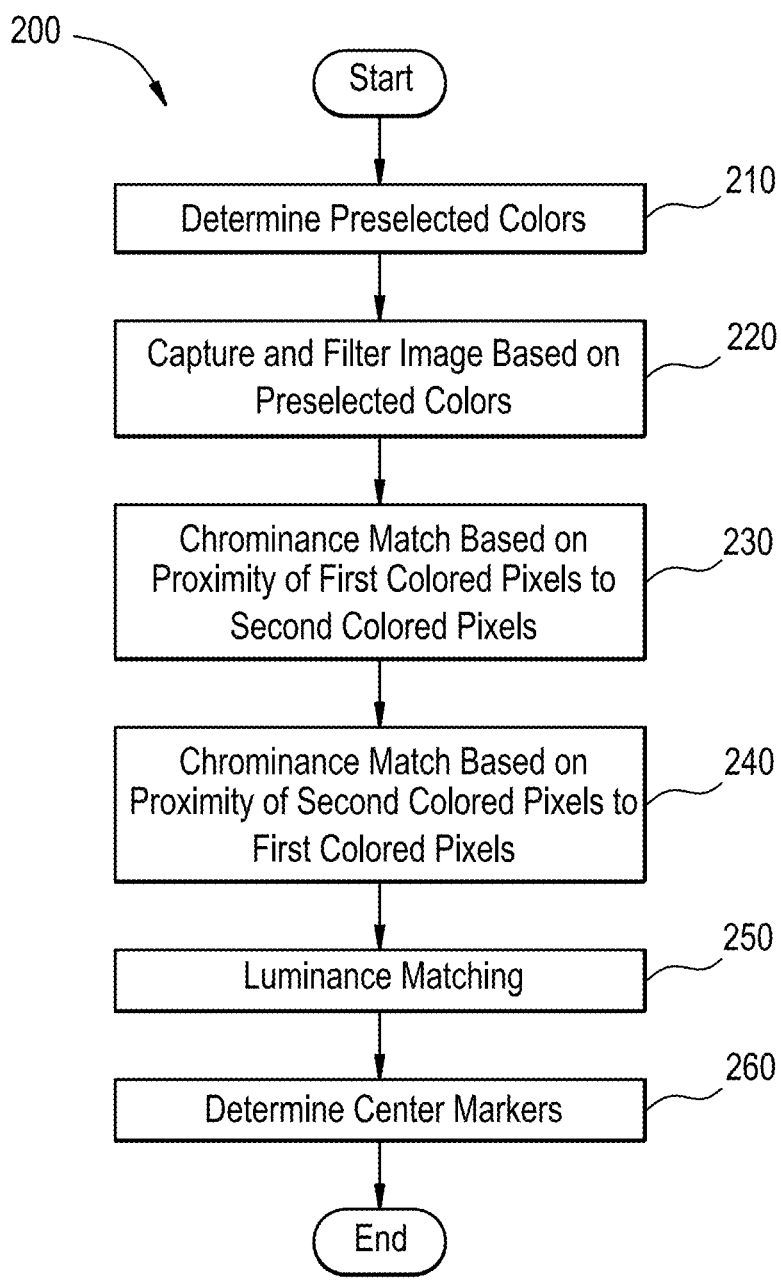
FIG. 2 illustrates a method for tracking a striking device, according to an embodiment.

FIG. 2 illustrates a method 200 for tracking a striking device. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 210, the preselected colors on the predetermined image patterns located on the striking device may be selected. For example, red (a first color) and green (a second color) may be the preselected colors for the predetermined image patterns. The red and green colors may be selected by a user on a computing device based on the color patterns physically located on the striking device.

At operation 220, an image captured by the camera may be filtered such that only pixels with the preselected colors, red and green, remain. The image may be filtered utilizing image editing techniques, such as those utilizing Chroma keys.

At operation 230, responsive to filtering the image, the chrominance matching hardware may determine green pixels that are within a given threshold distance from at least one red pixel. The chrominance matching hardware may be configured to remove green pixels from the image that are not within the given threshold from at least one red pixel.

At operation 240, the chrominance matching hardware may determine red pixels that are within a given threshold from at least one green pixel. The chrominance matching hardware may be configured to remove red pixels from the image that are not within the given threshold from at least one green pixel. Accordingly, the chrominance matching hardware may be configured to filter the image such that the image only includes the preselected colors, wherein both of the preselected colors are in close proximity to each other. This may remove pixels from the image that contain the preselected colors in the background that are not part of the predetermined pattern.

At operation 250, the luminance matching hardware may determine the relative luminances of the remaining pixels within regions that are within close proximity of each other. If the relative luminance of the remaining pixels is not within a predetermined luminance ratio, the pixels may be removed. In embodiments, the luminance ratio may be determined based on the luminance ratio of the predetermined pattern on the striking device. Utilizing the chrominance matching hardware and the luminance matching hardware, background regions that happen to contain the preselected colors may be filtered out of the image.

At operation 260, a white spot or other markers may be positioned at the centers of each of the remaining regions in the image, which represent the predetermined image patterns. The markers associated with each of the images may be utilized for further processing to determine the movement of the striking device. For example, the markers may be utilized to determine the bend or speed of the striking device in a single image or over a plurality of images.

Figure 3:
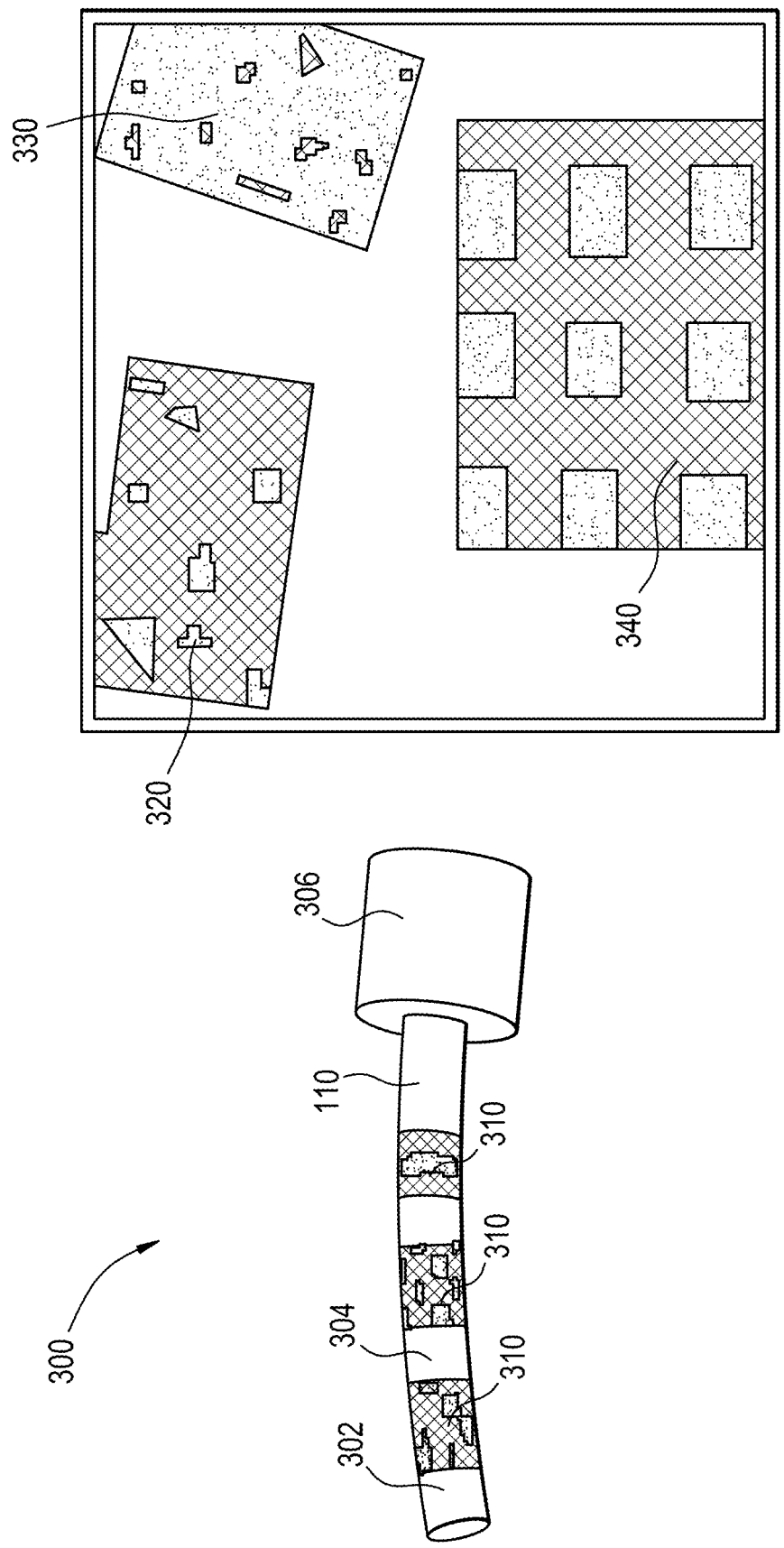
FIG. 3 depicts an image captured by a camera of the motion tracking hardware, according to an embodiment.

FIG. 3 depicts an image captured by a camera of the motion tracking hardware, according to an embodiment. FIG. 3 depicts an embodiment of an image 300 that may be created by a fast-action strike on the striking device. This image 300 may be one frame of a video shot that is captured via a common smart phone. This image 300 may have occurred after the striking device was impacted by force, and the striking device is still showing some bend due to the force. The arm of the user striking the striking device may be blurred due to its speed of movement of the arm. However, the image of the striking device is quite stable due to the dampening of the strike, because the striking device dampens the energy and speed of the motion to a level reasonable for processing with a non-high-speed camera.

The image may include a representation of striking device 110, with handle 302, shaft 304, and head 306. Shaft 304 and head 306 may be configured to dampen, reduce, and lessen the speed of movement of striking device 110. For example, head 306 may include a greater weight and width than shaft 304. This may reduce the speed of shaft 304. Handle 302 may be configured to make the proximal end of striking device 110 substantially stationary. By limiting the movement of striking device 110 at one end, the motion tracking hardware may more efficiently and effectively capture the predetermined image patterns 310.

As depicted in FIG. 3, each of the image patterns 310 may be positioned on the shaft 304 of striking device 110, and may be positioned around the circumference of shaft 304 at substantially even intervals. The image patterns 310 may be positioned at various intervals from the first end of shaft 304 to the second end of shaft 304 to allow the motion tracking hardware to determine the bend and/or movement of striking device 110.

Furthermore, each of the image patterns 310 may have different patterns comprising different subsections of two different colors, wherein the ratio of the two colors within the predetermined image patterns 310 is substantially equal. The two different colors may be arranged in close proximity to each within image patterns 310. Accordingly, each of the image patterns 310 may have different positioning of the color patterns, but may have the same luminance ratio and may utilize the same chrominance matching threshold.

As also depicted in FIG. 3, the capture image may include noise 320, 330, 340. The noise may have the same two colors as image patterns 310. However, the noise may not have the colors in close proximity to each other, or the noise may not have the same luminance ratios of the two colors.

Figure 4:
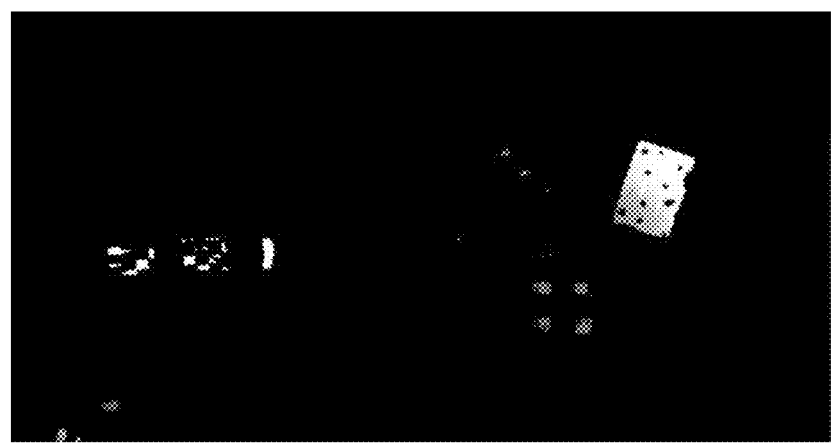
FIG. 4 depicts an image that includes only the pixels of a first color, according to an embodiment.
Figure 5:
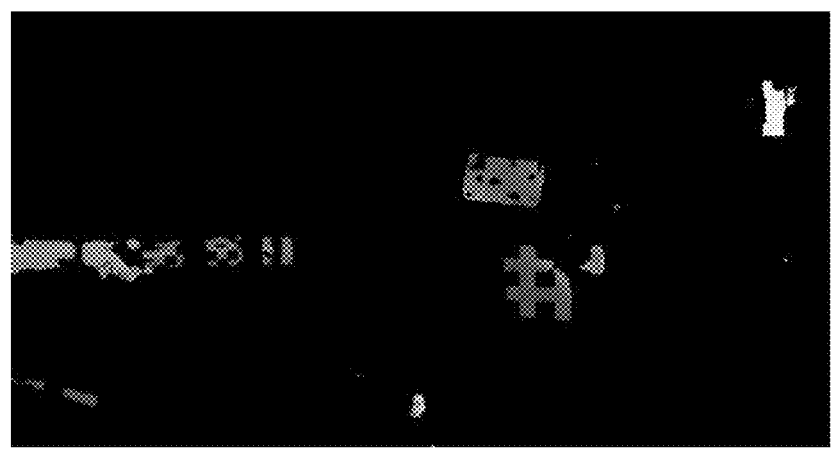
FIG. 5 depicts an image that includes only the pixels of a second color, according to an embodiment.

FIG. 4 depicts a filtered FIG. 3, wherein only the green pixels are depicted in the image. FIG. 5 depicts a filtered FIG. 3, wherein only the red pixels are depicted in the image. Because there is background noise in the images with the same colors as the preselected colors within in FIGS. 4 and 5, the background noise will remain within the image after filtering.

Figure 6:
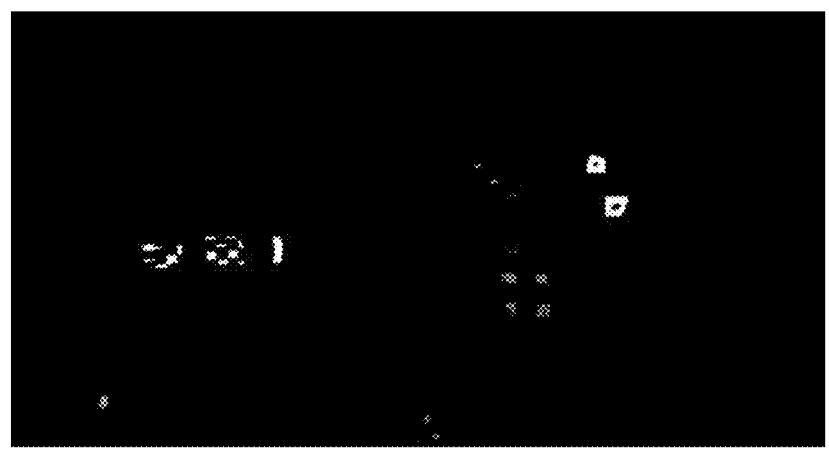
FIG. 6 depicts an image that includes only pixels of a first color that are within a given threshold from at least one pixel of a second color, according to an embodiment.

Responsive to filtering the image in FIG. 3 with only the green pixels to produce FIG. 4, the chrominance matching hardware may determine green pixels that are within a given threshold from at least one red pixel. An embodiment of such is depicted in FIG. 6. The chrominance matching hardware may be configured to remove green pixels from the image that are not within the given threshold from at least one red pixel.

Figure 7:
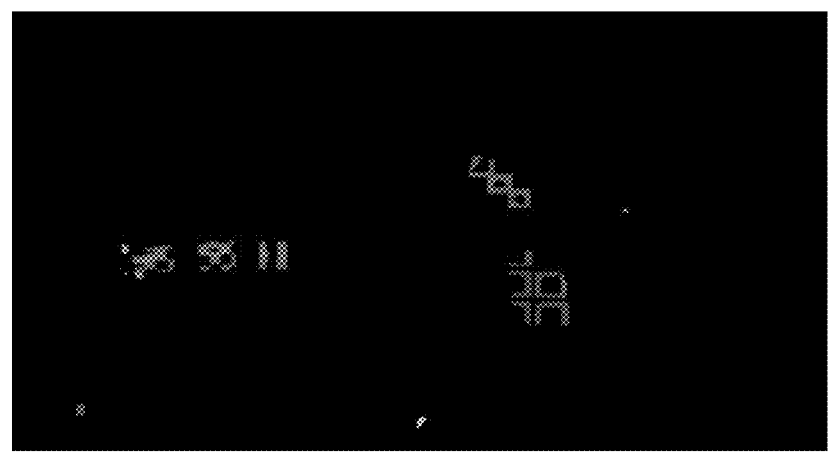
FIG. 7 depicts an image that includes only pixels of a second color that are within a given threshold from at least one pixel of a first color, according to an embodiment.

Responsive to filtering the image in FIG. 3 with only the red pixels to produce FIG. 5, the chrominance matching hardware may determine red pixels that are within a given threshold from at least one green pixel. An embodiment of such is depicted in FIG. 7. The chrominance matching hardware may be configured to remove red pixels from the image that are not within the given threshold from at least one green pixel.

Figure 8:
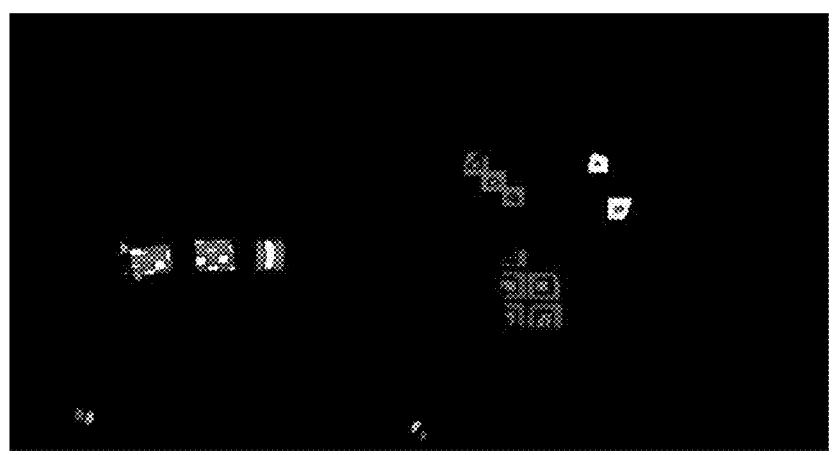
FIG. 8 depicts an image where the pixels with first-color and second-color pixels are grouped into regions that are within a close proximity to each other, according to an embodiment.

Responsive to determining filtering the image in FIG. 3 such that only green pixels that are within a given threshold to red pixels, and vice versa, an image depicted in FIG. 8 may be created.

Figure 9:
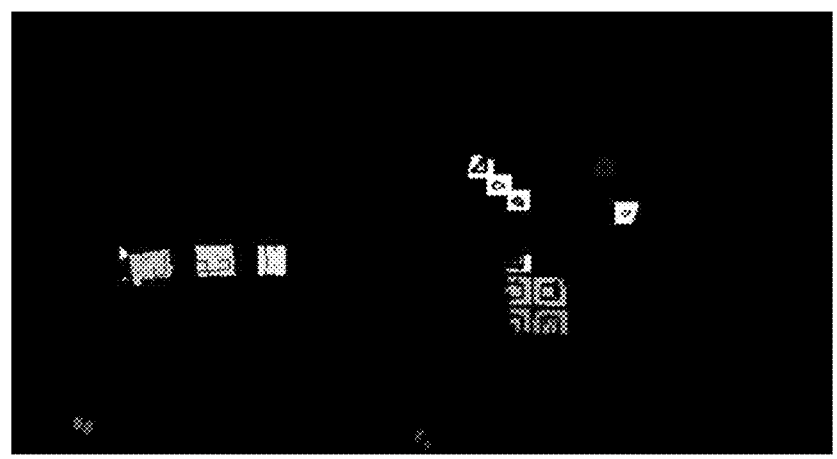
FIG. 9 depicts a grayscale image where the pixels with first-color and second-color pixels are grouped into regions that are within a close proximity to each other, according to an embodiment.
Figure 10:
FIG. 10 depicts an image wherein the regions where the relative luminance's of the regions are not within a given predetermined luminance ratio range have been discarded, according to an embodiment.

FIG. 9 depicts a grayscale image where the pixels with green and red pixels are grouped into regions that are within a close proximity to each other. As such, the image depicted in FIGS. 8 and 9 may only present patterns with the two predetermined colors being in close proximity to each other without considering the luminance ratio of the remaining patterns. FIG. 10 depicts an image wherein the regions where the relative luminance's of the regions are not within a given predetermined luminance ratio range. FIG. 10 further depicts a white marker positioned within the center of the regions that pass both the chrominance matching step and the luminance matching step. In other embodiments, the white marker may be represented by any positional symbol and/or data. Data associated with the white markers may be utilized in further processing to determining the bend of the device, which may be utilized to auto-detect strikes. In further embodiments, if the markers for the remaining regions are not within a given distance threshold from at least one other marker in a plurality of frames, then that remaining regions outside of the given threshold may be further filtered out of the images. This may further assist in removing noise from the images.

Embodiments described above are related to using the striking device as an "offensive practice" device, where the device was held stationary and strikes were performed on it. In this regard, the "head" of the device is representative of a larger target such as the head or torso of an opponent. In other embodiments, the device can also be used in a "defensive practice" mode. When used in a defensive practice mode, the device will be rotated 180 degrees, such that a user holds the device at the part of the shaft closest to the head. In this regard, the "handle" of the device is representative of a smaller object, such as a fist, foot, or tip of a sword. The smaller object may represent an object that is coming towards someone doing the defensive practice (the "defender"). In the defensive practice mode, the device will be swung towards the defender with either a "linear" motion, or a "swinging" motion.

When the device is swung in a liner motion, the linear motion represents a linear punch or kick towards the defender, which the defender can either block or avoid. When the device is swung in a swinging motion, it may represent a weapon (such as a sword) which the defender can either block (perhaps with some sort of weapon or shield), or avoid. Also, the swinging motion can represent a circular kick towards the defender.

In the defensive mode, embodiments may utilize the same type of processing as the striking mode to determine if the blocks or avoidances were performed effectively, taking into account of the linear or swinging motion of the device (whereas in the previous example of "offensive practice", the device was generally held stationary before being struck).

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An isotropic motion tracking system comprising:
    a striking device with a plurality of predetermined image patterns, each of the plurality of predetermined image patterns including a first color and a second color with a predetermined luminance ratio, wherein the specific shape or orientation of the plurality of image patterns do not affect the motion tracking system, wherein each of the plurality of the image patterns are a different shape, and the first color and the second color are within the YCrCb color space;
    a camera configured to capture multiple successive images showing movement of the striking device;
    a color filter configured to filter an image captured by the camera including the striking device, wherein the filter removes pixels from the image that do not include the first color or the second color;
    a chrominance matching device configured to filter the image to create image regions by removing each pixel of the first color from the image that is determined to be not within a given threshold pixel distance from at least one pixel of the second color, and removing each pixel of the second color from the image that is determined to be not within the given threshold pixel distance from at least one pixel of the first color;
    a luminance matching device configured to determine relative luminances of the image regions, and removing a first image region from the image in response to the relative luminance of the first image region from the image is not within a predetermined luminance ratio range.

2. The motion tracking system of claim 1, wherein the striking device includes a handle, a shaft, and a head, wherein a first width and a first weight of the head is greater than a second width and a second weight of the shaft.

3. The motion tracking system of claim 1, wherein the plurality of predetermined image patterns are positioned on a shaft of the striking device.

4. The motion tracking system of claim 1, wherein each of the plurality of predetermined image patterns includes a luminance ratio within the predetermined luminance ratio range.

5. The motion tracking system of claim 4, wherein each of the pixels of the first color within each of the plurality of predetermined image patterns is within the given threshold pixel distance from the at least one pixel of the second color.

6. The motion tracking system of claim 5, wherein each of the pixels of the second color within each of the plurality of predetermined image patterns is within the given threshold pixel distance from the at least one pixel of the first color.

7. The motion tracking system of claim 1, wherein the luminance matching hardware is configured to determine a center of each of the image regions without requiring any calculations determining the rotation orientation, perspective distortion, or geometric shape of any of the image regions.

8. The motion tracking system of claim 7, wherein the luminance matching hardware is configured to determine marker data associated with each of the centers of each of the image regions, the marker data including a time stamp, positioning data, and identifier associated with a corresponding image region.

9. The motion tracking system of claim 8, wherein the positioning data is configured to determine a position of the predetermined image patterns in a two-dimensional projection of three-dimensional coordinates, for the purposes of detecting strikes and similar perturbations associated with the positioning data.

10. A method for isotopically tracking movement of a striking device, the method comprising:
    positioning a plurality of predetermined image patterns on a striking device, each of the plurality of predetermined image patterns including a first color and a second color with a same luminance ratio, wherein the specific shape or orientation of the plurality of image patterns do not affect the method for tracking the movement of the striking device, wherein each of the plurality of the image patterns are a different shape, and the first color and second color are within the YCrCb color space;

capturing, via a camera, multiple successive images showing movement of the striking device;

filtering an image captured by the camera including the striking device by removing pixels from the image that do not include the first color or the second color;

filter the image to create image regions by removing each pixel of the first color from the image that is determined to be not within a given threshold pixel distance from at least one pixel of the second color, and removing each pixel of the second color from the image that is determined to be not within the given threshold pixel distance from at least one pixel of the first color;

determining relative luminances of the image regions; and removing a first image region from the image in response to the relative luminance of the first image region from the image is not within a predetermined luminance ratio range.

11. The method of claim 10, wherein the striking device includes a handle, a shaft, and a head, wherein a first width and a first weight of the head is greater than a second width and a second weight of the shaft.

12. The method of claim 10, further comprising:
positioning the plurality of predetermined image patterns on a shaft of the striking device.

13. The method of claim 10, wherein each of the plurality of predetermined image patterns includes a luminance ratio within the predetermined luminance ratio range.

14. The method of claim 13, wherein each of the pixels of the first color within each of the plurality of predetermined image patterns is within the given threshold pixel distance from the at least one pixel of the second color.

15. The method of claim 14, wherein each of the pixels of the second color within each of the at least one predetermined image patterns is within the given threshold pixel distance from the at least one pixel of the first color.

16. The method of claim 10, further comprising:
determining a center of each of the image regions without requiring any calculations determining the rotation orientation, perspective distortion, or geometric shape of any of the image regions.

17. The method of claim 16, further comprising:
determining marker data associated with each of the center of each of the image regions, the marker data including a time stamp, positioning data, and identifier associated with a corresponding image region.

* * * * *